Nov. 24, 1942.　　　O. M. BUNDY　　　2,302,838

PRESS MOTOR CONTROLS

Filed Sept. 11, 1940　　　4 Sheets-Sheet 1

INVENTOR.
Oswald M. Bundy
BY Harry R. Canfield
ATTORNEY.

Nov. 24, 1942.     O. M. BUNDY     2,302,838
PRESS MOTOR CONTROLS
Filed Sept. 11, 1940     4 Sheets-Sheet 2
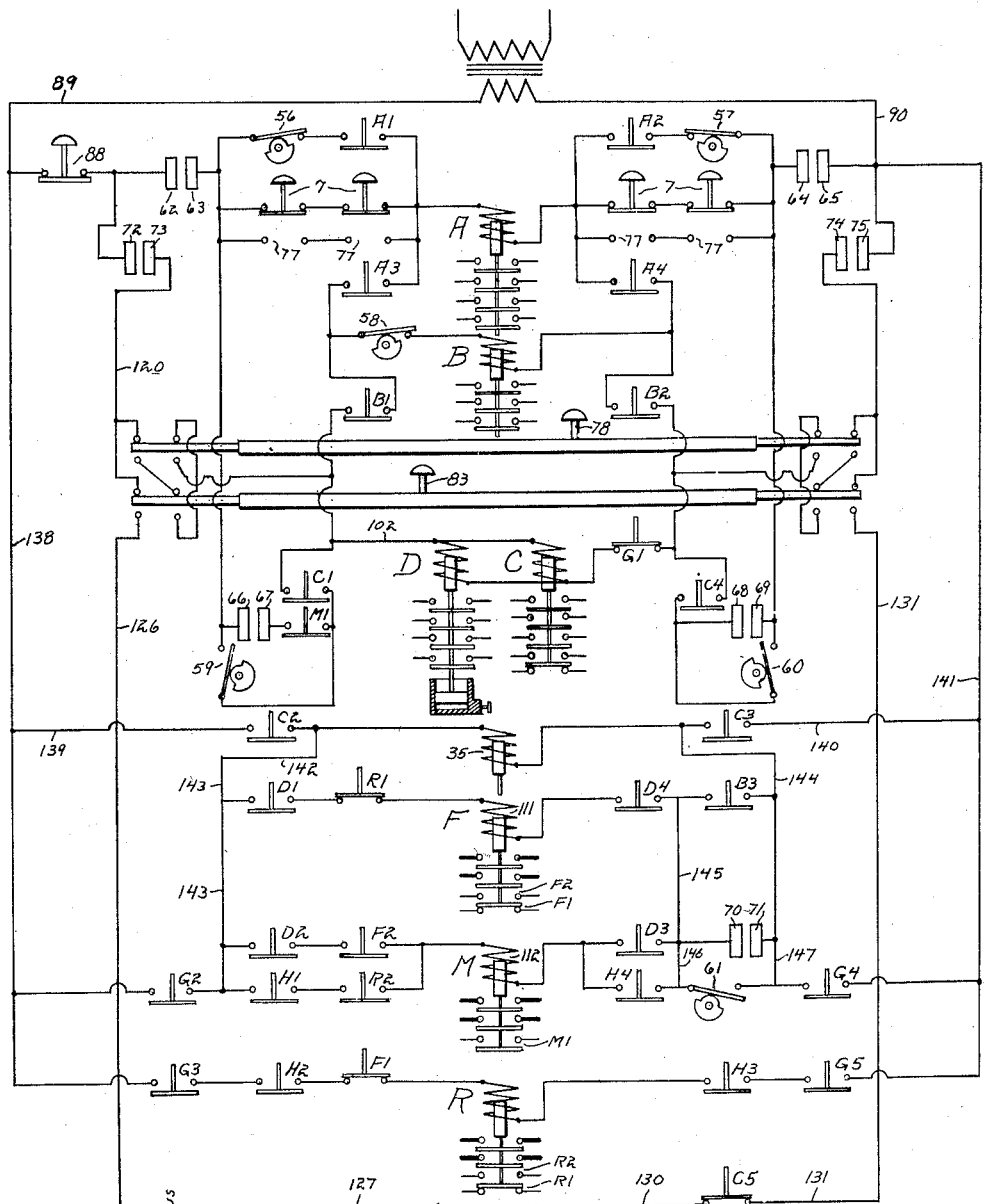
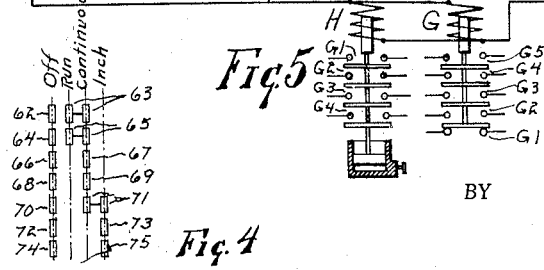
INVENTOR.
Oswald M. Bundy
BY Harry R. Canfield
ATTORNEY.

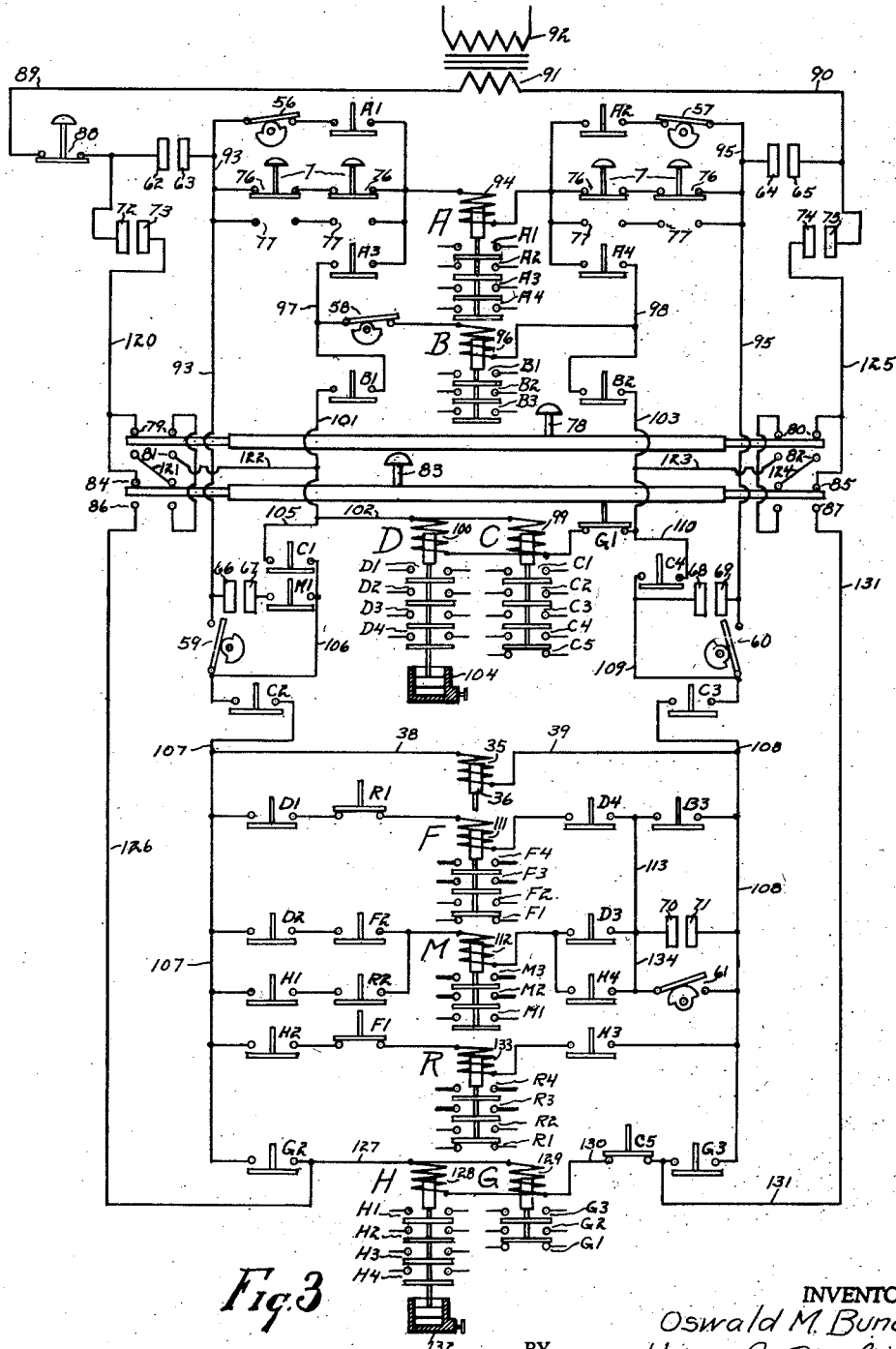

Nov. 24, 1942.     O. M. BUNDY     2,302,838
PRESS MOTOR CONTROLS
Filed Sept. 11, 1940     4 Sheets-Sheet 4

INVENTOR.
Oswald M. Bundy
BY  Harry P. Canfield
ATTORNEY.

Patented Nov. 24, 1942

2,302,838

UNITED STATES PATENT OFFICE 2,302,838

PRESS MOTOR CONTROLS

Oswald M. Bundy, Cleveland Heights, Ohio, assignor to The Clark Controller Company, Cleveland, Ohio, a corporation of Ohio Application September 11, 1940, Serial No. 356,298

7 Claims. (Cl. 192—144)

This invention relates to electrical control systems for machinery of the class in which a cycle of movements is performed, for example, power presses in which a reciprocator or head reciprocates in one direction from a starting position, to perform a pressing operation on work pieces, and then is reciprocated back in the other direction to the starting position to complete the cycle; and the invention relates particularly to electrical control systems for controlling the power applied to the machine to control the operation thereof, and to insure against abnormal operation such as unintended starting of the machine or unintended continued or repeat operation thereof, et cetera, whereby the machine or the work might be damaged or workmen at the machine might be injured.

Such control systems have been proposed in which the power for the machine is supplied by a continuously running electric motor, a clutch being provided to transmit the motor power to the machine to start and operate it and a brake being provided to stop the machine; and the clutch and brake have been so arranged that the brake is dis-engaged when the clutch is engaged and vice versa; and a control system for the clutch and brake has been provided operable by power such as pneumatic power under the control of a plurality of operators' push-buttons.

According to the present invention, the power is supplied by an electric motor which is at all times connected directly mechanically to the machine, and the operations of the machine are effected by starting and stopping the motor, a brake being provided to bring the machine and the motor quickly to rest at the time of stopping. The clutch of prior systems therefore is not necessary and is eliminated. The energization of the motor to start it, to initiate the cycle of operations of the machine, is effected through the agency of a control system utilizing magnetic contactors and under the control of push-buttons operated by the operators of the machine; and the control system is arranged to provide safety features including among other things provision to insure that the hands and arms and other parts of the operators' bodies will be out of the path of moving parts of the machine before the motor can be started, and to insure that the operators must remain in such safety positions until the operation of the machine has passed through enough of the cycle to remove the liability of danger; and provision to insure that the motor of the machine will stop automatically at the end of a cycle of operation; and that after one cycle has been completed and the motor and parts have stopped, another cycle will not be automatically initiated even if the operators should inadvertently hold any of the push-buttons operated, and not until all of the push-buttons have been released and again operated.

A master selector or controller is provided which may be set to change the operating characteristics of the control system to cause it to effect optionally either the stopping automatically of the machine at the end of each cycle; or continuous repeat operation of the machine, cycle after cycle, after the machine has once been started and subject to being stopped at any time by manually operable means such as stop push-buttons; or to effect small inching increments of movement of the motor and machine such as is usual in setting up the dies and the work in the machine preparatory to continued production use thereof; and to provide for such inching operations, the motor and machine may be operated in the forward or the reverse direction, as optionally desired.

The control system comprises, beside push-buttons under the control of the machine operators, and besides the master selector or controller, contactors operated mechanically by the movement of an element of the machine, and electromagnetic contactors; and simplification is effected to the end that the control of the electric power to the motor to drive it in the forward or in the reverse direction as desired, is effected by only three motor current or main current magnetic contactors.

As stated hereinbefore, the clutch of prior systems is eliminated by the present invention, and the brake for stopping the motor and the machine is operated by power under the control of an electro-magnetic device having an actuating winding constituting part of the control system.

While the control system of the present invention comprises electro-magnetic contactors to initiate energization of the said device winding and of the motor current contactors under the control of manual push-buttons or like contactors, the breaking of the control current thereto may be effected directly by the push-buttons upon opening them whereby accidental sticking closed of any electro-magnetic contactor, which may occur in practice, cannot result in accidental or unexpected abnormal operation of the system and the machine, with the attendant dangers thereof, when the push-buttons are opened with the intention of stopping the machine.

The present invention has perhaps its most important application to power operated presses of the vertically reciprocatory type and will therefore be illustrated and described as applied to that use, although as will become apparent hereinafter my invention is not limited in its application to presses, but may be applied generally to machinery which has a cycle of operations.

It is among the objects of this invention:

To provide generally an improved control system for cyclically operating machines of the type in which an electric motor supplying power to the machine is mechanically connected thereto at all times;

To provide generally an improved control system for cyclically operating machines of the class referred to having provision to insure that the machine will not accidentally start or accidentally continue to run when not intended;

To provide a control system for cyclically operating machines of the type referred to in which the energization of the motor to start it is controlled by a plurality of operator's push-buttons and having improved means for causing the machine and the motor to positively stop upon release of any one of the push-buttons;

To provide a control system for cyclically operating machines of the class referred to employing an electro-magnetically controlled brake to stop the machine and motor, and having improved means for insuring that the brake will be released before electric power is given to the motor to start it;

To provide in a control system for cyclically operating machines of the class referred to in which the control of power to drive the machine is effected by a system actuated upon closing operators' push-buttons, improved means whereby the motor will be de-energized and stopped upon the release of any push-button;

To provide a control system for the motor of a cyclically operating machine by which among other features the motor and the machine may be started only after all of the operators' push-buttons are closed; and will stop if any push-button is released and unless the push-buttons are held closed for a predetermined part of the operating cycle of the machine; and which will continue to run to the end of the cycle after the push-buttons have been released; and which will automatically stop at the end of the cycle; and in which the portion of the operating cycle through which the push-buttons must be held closed may be adjustably varied in an improved manner; and in which the machine will stop automatically at the end of the cycle in the event of voltage failure or in the event that the push-buttons are held operated and not released at all; and which cannot be started to begin a cycle unless all of the push-buttons have been released;

To provide generally an electric control system for machines of the cyclically operating type having improved means for insuring safety of operation thereof by preventing accidental operation thereof with consequent liability of damage to the machine or to the work or to workmen who may be operating the same;

To provide in a control system of the type referred to comprising an electro-magnetic brake, and an electro-magnetic device controlling it and in turn controlled by a push-button, improved means whereby the energization of the device may be effected after closure of the push-button but de-energization thereof may be effected directly at the push-button upon opening it.

Other objects will be apparent to those skilled in the art to which my invention appertains.

My invention is fully disclosed in the following description taken in connection with the accompanying drawings in which:

Fig. 1 is a front elevational view in some respects diagrammatic of a power operated press to the control of which my invention is particularly applicable, and illustrating in connection therewith a brake and an electro-magnetically operable valve device for controlling fluid pressure to operate the same, and illustrating also diagrammatically a number of limit switches operated by movement of the main shaft of the press;

Fig. 3 is a diagrammatic view illustrating the preferred control system for the machine of Fig. 1 and embodying my invention;

Fig. 4 is a diagrammatic view of a master controller or selector which may be used with the system of Fig. 3;

Fig. 5 is a view similar to Fig. 3, but illustrating a modification;

Figures 1, 2:
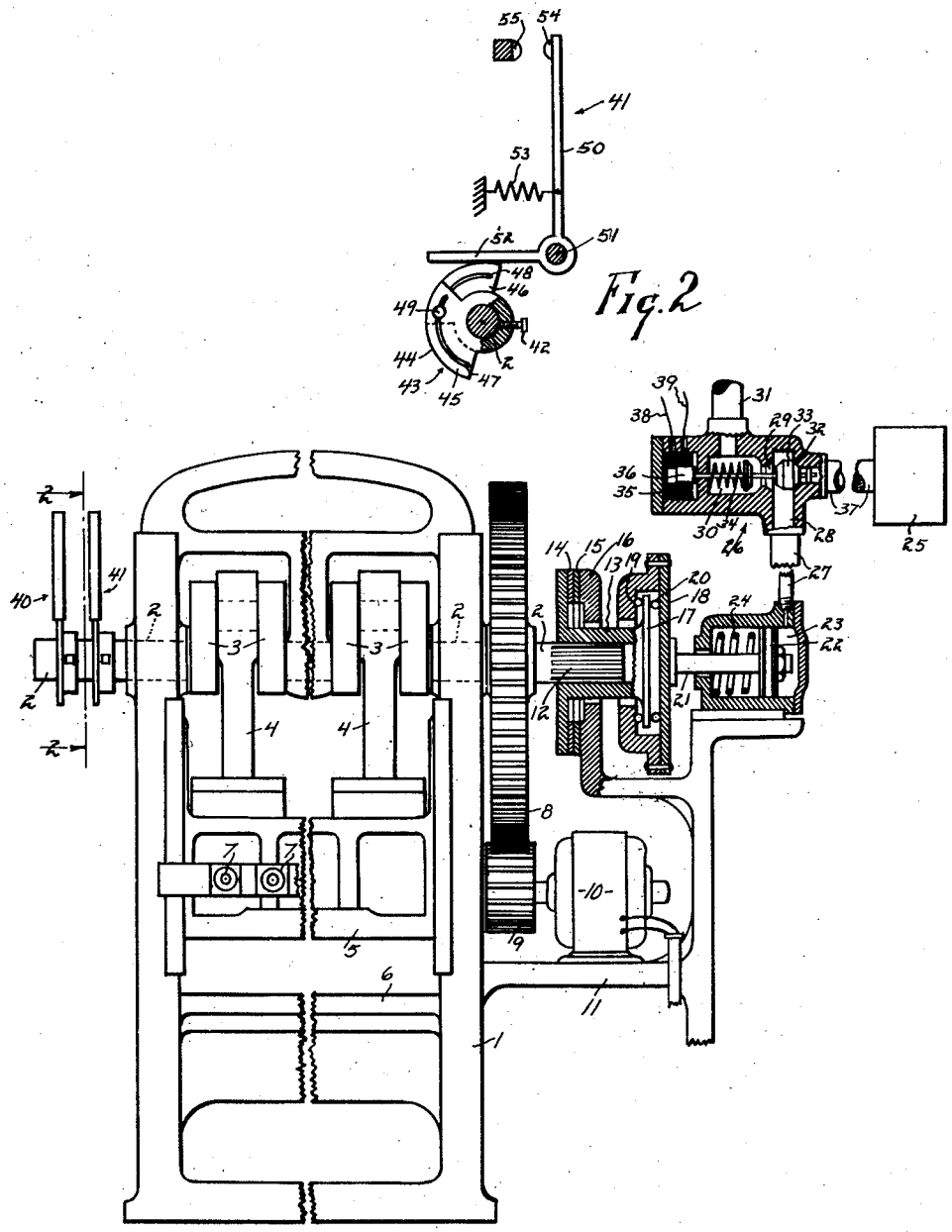
Fig. 2 is a view taken generally from the plane 2—2 of Fig. 1, and illustrating in side elevation and somewhat diagrammaticaly one of the limit switches of Fig. 1, with means for adjusting the operation thereof.

Referring to the drawings, Figs. 1 and 2, I have shown generally at 1 the main base of a power-operated press having a crank shaft 2 and a pair of cranks 3—3 which operate connecting rods 4—4 to reciprocate an upper head 5 toward and from a stationary head 6 to perform pressing operations upon work-pieces placed in dies or the like (not shown), but to be as usual mounted on the heads 5 and 6.

A revolution of the shaft 2 and a complete alternate reciprocation of the head 5 constitutes a cycle of operations of the machine, and the parts are illustrated in Fig. 1 at the beginning of the cycle.

Mounted adjacent to the machine or upon it is a plurality of operators' push-buttons 7—7. Preferably two push-buttons are provided for each operator of the machine and usually a number of pairs of such push-buttons will be provided, although only one pair has been shown, and the control system to be described is arranged so that all of the operators' push-buttons must be closed before the head 5 will start downwardly whereby the operator's hands and arms and other parts of his body will be out of the line of movement of the head 5, and therefore out of danger of injury thereby, and to this end the push-buttons 7—7 may be disposed at some distance from the head 5.

A gear 8 is mounted on the shaft 2 and is meshed with a motor pinion 9 on the shaft of an electric motor 10 supported on the frame 1 or upon a bracket 11 thereof.

The end of the shaft 2 projects outwardly beyond the gear 8 and is splined as shown at 12 and meshed with the splines is the hub 13 of a brake actuator having a brake ring 14 normally engaged with a brake ring 15 mounted on a bracket 16 on the machine frame. The actuator has a ball race 17 diagrammatically shown to be in the form of a disc within a housing 18 in which are mounted ball bearings 19 and 20 on opposite sides of the race 17; and the housing 18 is connected to the piston rod 21 of a piston 22 reciprocable in a cylinder 23; and the piston 22 is normally held toward the right, as viewed in the drawing, by a spring 24; and the thrust of the spring is transmitted through the piston 22 and housing 18, and thence through the ball bearing 19 to the disc 17, and to the actuator 13, and thereby holds the brake ring 14 in engagement with the brake ring 15, and acting through the splines 12 exerts a braking action on the shaft 2 to hold it from rotation or to stop it if it is rotating.

When the piston 22 is reciprocated toward the left, as viewed in the drawing, against the tension of the spring 24, the actuator 13 is moved by the ball bearing 20 toward the left on the splines 12 and dis-engages the brake rings 14 and 15 to free the shaft so that the motor 10 may freely drive the press when energized.

The piston 22 is operated by air pressure from a source 25 controlled by a valve device shown generally at 26. In the normal position of the parts illustrated, the cylinder 23 is exhausted through a conduit 27 to a chamber 28, through a valve port 29 to a chamber 30 and out to atmosphere at 31, and the air pressure from the source 25 is cut off at a port 32 by a valve 33 held in port-closing position by a spring 34.

An electro-magnetic winding 35 is provided which, when energized, moves a plunger 36 to compress the spring 34 and retract the valve 33 to uncover the port 32 and close the port 29, whereupon air pressure from the source 25 flows by a conduit 37 through the port 32 to the chamber 28, and by the conduit 27 to the cylinder 23 to move the piston 22 against the tension of the spring 24 for the purpose of releasing the brake as described.

From the foregoing description, it will now be apparent that when the electro-magnetic winding 35 of the valve device 26 is energized the brake of the machine is released and that when the winding 35 is de-energized the brake is set by the spring 24; and that energization of the winding 35 may be effected by an electric circuit comprising wires 38 and 39.

The left-hand end of the shaft 2, as viewed in Fig. 1, extends beyond the machine and has mounted thereon a plurality of cam-operated limit switches 40 and 41, the general location of these being indicated diagrammatically in Fig. 1, and the construction of one of them being illustrated in Fig. 2.

Any desired number of such limit switches may be employed, two being shown in Fig. 1 and six being shown in the control system of Fig. 3.

Upon the shaft 2, Fig. 2, is mounted by means of a screw 42, a cam 43 having a cam surface 44, preferably in two overlapping parts, a front part 45 and a rear part 46 having arcuate slots 47 and 48 therein respectively, through which a clamp bolt 49 is projected to lock them together. The part 45 is secured upon the shaft 2 by the screw 42, but may be adjustably positioned around the shaft by loosening the screw and shifting the part and again tightening the screw, and the part 46 may be shifted around the shaft and then secured to the part 45 by the bolt 49 whereby the extent of the cam surface 44 may be adjustably varied as well as its angular position around the shaft 2.

A contactor arm 50 is pivotally mounted on a suitable support 51, not shown in Fig. 1, and has a finger 52 engaged with the cam surface 44 by a spring 53 and the arm 50 carries a movable contact 54 opposite a stationary contact 55.

As will be apparent from this diagrammatic construction, when the shaft 2 is rotated, the cam surface 44 will leave the finger 52 and the spring 53 will close the contacts 54 and 55 and as the shaft continues to rotate the finger 52 will ride up on the cam surface 44 and disengage the contacts 54—55.

Obviously the cam switch of Fig. 2 may, when the shaft 2 is at the beginning of its cycle, be positioned either to cause the contacts 54—55 to be engaged or dis-engaged.

Referring now to Figs. 3 and 4 which illustrate the control system embodying my invention in its preferred form, six of these cam-operated limit switches have been reproduced diagrammatically as follows: switches 56, 57 and 58 normally closed and switches 59, 60 and 61 normally open; and in Fig. 3 is reproduced the valve winding 35 and its plunger 36 and the circuit wires 38 and 39 thereof as well as the push-buttons 7—7, four of the same being shown.

Besides the parts referred to above there is in Fig. 3 a magnetic contactor shown generally at A having four sets of normally open contacts A1, A2, A3, A4; and a magnetic contactor B having three sets of normally open contacts B1, B2, B3; and a magnetic contactor C having four sets of normally open contacts C1, C2, C3, C4, and a set of normally closed contacts C5; and a magnetic contactor D having four sets of normally open contacts, D1, D2, D3, D4; and a magnetic contactor F having a normally closed set of control contacts F1, and a normally open set of control contacts F2, and two sets of normally open main motor current contacts, F3 and F4; and a magnetic contactor M having a set of normally open control contacts M1 and a pair of normally open main motor current contacts M2 and M3; and a magnetic contactor R, having a set of normally closed control contacts R1, and a set of normally open control contacts R2, and a pair of normally open main motor current contacts R3 and R4; and a magnetic contactor G having a set of normally closed contacts G1, and two sets of normally closed contacts G2 and G3; and a magnetic contactor H having four sets of normally open contacts H1, H2, H3, H4.

Figure 6:
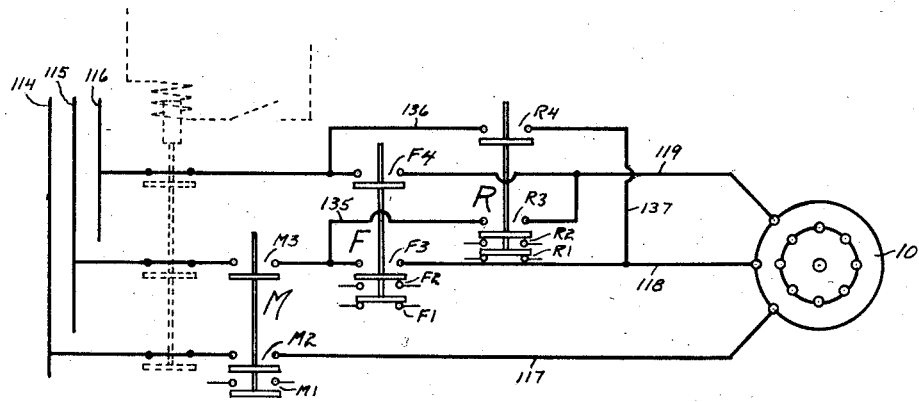
Fig. 6 is a diagrammatic view illustrating the power circuit to an electric motor shown in Fig. 1.

To simplify the circuits of the system of Fig. 3, the control contacts of the switches A, B, C, D, F, M, R, G, H, are reproduced elsewhere in Fig. 3; and the main motor current contacts of the contactors F, M and R are reproduced in Fig. 6, in connection with the motor which they control.

The master controller or selector, Fig. 4, when operated as will be described, closes pairs of contacts and these pairs of contacts 62—63 to 74—75 inclusive, in pairs, are also reproduced in Fig. 3.

The operators' push-buttons 7—7—7—7 each control normally closed contacts 76—76 and normally open contacts 77—77. An inching control push-button 78 for effecting inching movements of the motor and the machine in the forward direction controls normally closed contacts 79 and 80 and normally open contacts 81 and 82; and an inching push-button 83 for controlling inching moving in the reverse direction controls normally closed contacts 84 and 85 and normally open contacts 86 and 87. A stop push-button is shown at 88 and any number of such stop-push-buttons in series may be provided.

The master controller or selector of Fig. 4 is provided to determine whether the system is to be operative or not; and whether the press is to run a single cycle and then stop; or whether it is to run continuously, cycle after cycle, after being once started until stopped; or whether it is to be inched ahead by small increments of movement such as are necessary to adjust the work and the dies on the heads 5 and 6 of the machine; and these positions are designated in Fig. 4, by the legends "Off," "Run," "Continuous," and "Inch," and the controller being illustrated in the "Off" position.

The various connections in the system will now be described in connection with a description of its operation as a whole.

Assuming that it be desired to operate the machine to "run" by single cycles, the controller of Fig. 4 is moved to engage the contacts of the "off" position with those of the "run" position, thereby connecting contacts 62—63 and 64—65, Fig. 4 and Fig. 3. In Fig. 3, current thereupon flows from the main 89 through the contacts of the push-button 88, contacts 62—63 to wire 93, through the contacts 76 of two of the push-buttons 7, through the winding 94 of the contactor A, through the contacts 76 of the other two push-buttons to a wire 95, through the contacts 64—65 to the main 90.

Contactor A is thereby operated closing its contacts A1 to A4.

A maintaining circuit is thereby made for the contactor A from the wire 93, through the closed limit switch 56, through now closed contacts A1, through the winding 94, through now closed contacts A2, through the limit switch 57, through the wire 95 and so on, thereby bridging the contacts 76 of the push-buttons 7—7, so that the contactor A will remain operated when the push-buttons 7—7 are presently depressed to open the contacts 76.

To start the motor 10 to start the press and initiate its cycle, the push-buttons 7—7 are depressed opening the contacts 76 and closing the contacts 77 thereof, and thereupon the winding 96 of the contactor B is energized, the current flowing as before to the wire 93, thence through the contacts 77 of the first two push-buttons, through now closed contacts A3 to a wire 97, through closed limit switch 58, through the winding 96, to a wire 98 thence through closed contacts A4, and through the other contacts 77 of the other push-buttons to wire 95, and so on, closing the contacts B1 to B5 of the contactor B.

The operation of the contactor B effects energization of the windings 99 and 100 of contactors C and D, the current which flowed to the wire 97 flowing through closed contacts B1, to a wire 101 and by wire 102 through the windings 99 and 100 in parallel and through normally closed contacts G1 to a wire 103, through closed contacts B2 to wire 98, and so on as before.

Contactor C operates at once, and contactor D is delayed in its operation by a dash-pot or other time-interval device 104. The operation of contactor C closes its contacts C1 to C4 and opens the contacts at C5. Upon the operation of contactor C, the winding 35, above referred to, which effects release of the brake, as above described, is now energized as follows. The current which flowed to the wire 101 flows to a wire 105 through now closed contacts C1, by a wire 106 through now closed contacts C2, to a wire 107, and thence to wire 38, to the winding 35, and by wire 39, to a wire 108, through closed contacts C3, by wire 109, through closed contacts C4, and by wire 110 to wire 103 as before. The winding 35, now receiving current, releases the brake of the press.

At the end of a time interval after the operation of the contactor C, determined by the time interval of the device 104 and which time interval is relatively short, the contactor D whose winding is energized as above described, operates and closes its contacts D1 to D4 and this effects in a manner which will now be described, energization and operation of contactors F and M in the order named, the current flowing through the contacts C2 as described to the wire 107 and thence through now closed contacts D1, closed contacts R1 to be referred to, through the winding 111 of contactor F, through now closed contacts D4 and through closed contacts B3 to wire 108 and through the closed contacts C3, as before, operating the contactor F, thereby closing control contacts F2 and opening control contacts F1, and also closing main motor current contacts F3 and F4 to be referred to.

Current also flows from the wire 107 through closed contacts D2, through now closed contacts F2, through the winding 112 of the contactor M, through closed contacts D3, by a wire 113, through contacts B3 to wire 108, etc., operating contactor M, closing its control contacts M1, and also the main motor current contacts M2 and M3.

The contactors F and M now being closed, reference may be had to Fig. 6, wherein these contactors are reproduced with the circuits which their main contacts control. In this figure, the motor is shown at 10, and is preferably of the three-phase induction type. Power supply lines are shown at 114, 115 and 116, and current now flows from the main 114 through the closed contacts M2, and by wire 117 to the motor 10; and current flows from the line 115 through the contacts M3 and contact F3 and by wire 118 to the motor; and current flows from the line 116 through the contacts F4 and by wire 119 to the motor 10, thus giving current to the motor and starting it and starting the cycle of the press connected to the motor.

Figure 7:
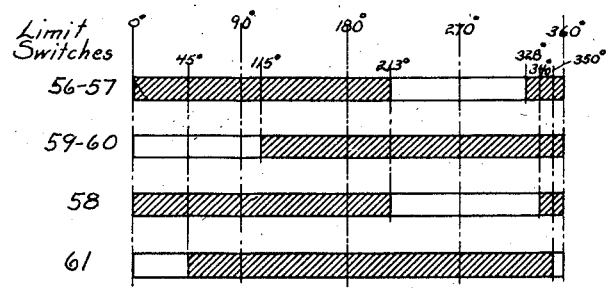
Fig. 7 is a view illustrating the timed sequence of operation of certain limit switches of Fig. 3.

The machine operated limit switches above referred to are, as described, adjustable to open or close at pre-selected points in the cycle of operation of the machine, or rotational positions of the shaft 2, and these are preferably, or as an illustrative instance, set to operate as follows, and as illustrated diagrammatically in Fig. 7, wherein shaded portions indicate closed condition.

The limit switches 56 and 57 are set to be closed at the beginning of the cycle, and they may be set to open when the main shaft has rotated 213 degrees and to close at 328 degrees.

The limit switch 58 is set to be closed at the beginning of the cycle and may be set to open at 213 degrees and close again at 340 degrees.

The limit switches 59 and 60 are set to be open at the beginning of the cycle and may be set to close at 115 degrees and to open at or near the end (beginning) of the cycle.

The limit switch 61 is set to be open at the beginning of the cycle and may be set to close at 45 degrees and open near the end of the cycle, say at 350 degrees.

The purpose of these settings will be explained hereinafter.

Continuing the description, the machine has started its cycle and the head 5 of the machine is descending. If now, for any reason, one of the operators, which may be any desired number, each controlling a pair of push-buttons 7—7, should want to stop the machine or should inadvertently remove a hand from a push-button so that he might then move his hand or his body into a position of danger, the machine will stop at once, because the control current to the motor contactors F and M, and to the brake winding 35 will thereby be broken and the brake will set and stop the machine.

It is one of the advantages of my invention that this interruption of control current is effected directly upon the contacts of the pushbuttons such as the contacts 77, as a feature of safety. For example, if the control current to the said contactors could only be broken at the contacts of the contactors B, C and D, and these contactors or some of them, should stick closed, as sometimes occurs in practice with electromagnetic contactors, the press would unexpectedly continue to run when the said push-button was opened. In the control system above described, the current to the brake winding 35 and to the windings of the motor contactors F and M, is initiated through the contacts of the electro-magnetic contactors B, C and D, after the push-button contacts 77—77 have been closed, but this control current is broken directly on the push-button contacts 77 if any of the push-buttons is opened. In practice, the amount of current taken by the brake-winding 35 and by the windings 111 and 112 of the motor contactors F and M is relatively large current when initiated, but when the brake and the said contactors have operated, the current is greatly reduced, due to the increased induction thereof effected by closing or partly closing the magnetic circuits of their electro-magnetic elements, and this reduced current can practicably be broken upon the push-button contacts 77, although for the size and type of push-buttons commonly employed in this art, it might be impracticable to initiate the current on the push-button contacts. It follows that the control current which effects starting of the motor and beginning of the cycle is initiated through the contacts 77 of the push-buttons after they are closed, but is infallibly interrupted directly upon these contacts to stop the press, in what may be called the dangerous part of the cycle.

After the press has made a part of the cycle such as 115 degrees, in the illustrative instance referred to, the head 5 of the press has moved sufficiently far down so that danger has passed, and it is desirable then to free the operators from their push-buttons to enable them to do some other work at the machine and to take over the control from the push-buttons 7—7, the limit switches 59 and 60 are provided, which now close.

Upon their closure, control current flows from the wire 93, as before through the closed limit switch 59 and there divides, part flowing by wire 106 through closed contacts C1, wire 105, wire 102, through the windings of the switches C and D, through contacts G1, wire 110, contacts C4, wire 109, closed limit switch 60, to wire 95, and so on, as before, holding the contactors C and D closed; and the other branch of the current flowing from the limit switch 59, through closed contacts C2, to wire 107 and thence as before through the windings 35, 111 and 112, to the wire 108, through closed contacts C3, and closed limit switch 60, to wire 95, and so on.

The machine now continues to operate under this control until the end of the cycle is reached, at or near which the limit switches 59 and 60 open again to interrupt the control current, cutting off the motor current at the switches F and M, and setting the brake by de-energizing the brake winding 35, and the press stops.

It will be observed that the limit switches 56 and 57 opened, at say, 213 degrees of the cycle, after the limit switches 59 and 60 had closed, and thereupon the contactor A opened, because its maintaining circuit through the limit switches 56 and 57 was opened, and this opened contacts A1 to A4. The contacts A1 and A2 prevent the contactor A from again closing when the limit switches 56 and 57 again close, say at 328 degrees, if the push-button contacts 77—77 are maintained closed by the push-buttons; and the open contacts A3 and A4 prevent the contactors B, C and D from being held closed after the limit switches 59 and 60 are open, even if the push-button contacts 77—77 are held closed. It follows therefore that even if all of the push-buttons 7—7 are held closed clear to the end of the cycle, the press will nevertheless come to rest at the end of the cycle.

On the other hand, if the push buttons 7—7 had all been released when or after the control thereof was taken over by the limit switches 59 and 60, and if therefore the push-button contacts 76—76 are closed at the end of the cycle, then the contactor A will remain operated; or if it had been opened by the limit switches 56 and 57, it will again close as in the first instance; but the press would nevertheless come to rest because the control circuit will be broken by the limit switches 59 and 60.

If, on the other hand, the push-buttons 7—7 had been maintained closed to the end of the cycle and the press came to rest, as described, and the contactor A therefore was open, then before another cycle can be initiated, the push-buttons 7—7 must all be released and close their contacts 76 to get the contactor A closed and then must all be depressed again to close the contacts 77 to initiate the next cycle.

The necessity of thus releasing all of the push-buttons to close their contacts 76—76 before another cycle can be initiated thereby is sometimes referred to as an anti-repeat safety feature.

If it be desired that the press shall operate continuously, cycle after cycle, after once being started, the master controller, Fig. 4, is moved to engage the "off" contacts with the "continuous" contacts thereby connecting contacts 62—63, 64—65, 66—67, 68—69, and 70—71, in Fig. 4 and in Fig. 3.

To start the press, the push-buttons 7—7 are again depressed to close the contacts 77—77 to energize the brake winding 35 to release the brake and to close the motor contactors F and M, contactors B, C and D, F and M, operating in sequence as before. As soon as the contactor M operates and closes the control contacts M1, control current flows from the supply mains 89 through the stop push-button 88, controller contacts 62—63, wire 93, controller contacts 66—67, closed contacts M1, to wire 106, and there the current divides, one branch flowing through contacts C1 to wires 105 and 102, through the windings of the contactors C and D, through closed contacts G1, contacts C4, controller contacts 68—69, wire 95, etc.; and the other branch flowing from wire 106, through contacts C2, to wire 107, and thence through the brake winding 35 and the windings of the contactors F and M, to wire 108 as before, and thence through contacts C3, and by wire 109, through contacts 68—69, to wire 95. Contactors C and D are thus held closed as are contactors F and M, and the brake winding 35 is maintained energized so that the press continues to run and repeat independently of the push-buttons 7—7 and the limit switches 59—60.

To stop the machine the stop push button 83 is operated and any number of such stop buttons may be provided at any desired locations and any one of them interrupts the current to the brake winding and to the windings of the contactors F and M, interrupting the motor current and stopping the machine, and opening all of the contactors, including the control contacts M1. When the stop-button 83 is restored, the control circuit for continuous operation is open at the contacts M1, and the machine does not again start, and must be again started by the operation of the push-buttons 7—7, as before, to close the contactor M and its contacts M1 for further continuous operation.

Of course, it will be understood that during "run" or cycle-by-cycle operation, as first described, operation of the stop-button 83, by cutting off all control current will open all of the contactors and set the brake.

Suppose now that it be desired to inch the press increment by increment as referred to, the controller of Fig. 4 is moved to engage the "off" contacts with the "inch" contacts, connecting contacts 70—71, 72—73, 74—75, in Fig. 4 and in Fig. 3.

To inch the press in the forward direction, the push-button 78 is depressed, opening contacts 79—80 and closing contacts 81—82. Current then flows from the supply main 89 through the stop push-button 83, controller contacts 72—73, by wire 120, closed contacts 84, wire 121, closed contacts 81, wire 122, wire 102, through the windings of the contactors C and D, contacts G1, wire 123, closed contacts 82, wire 125, and contacts 74—75 to wire 90.

Contactors C and D then close in sequence as described, and then current flows from the wire 122 to wire 105, contacts C1, wire 106, contacts C2, wire 107, through contacts D1, contacts R1, winding of the switch F, contacts D4, wire 113, contacts 70—71, wire 108, contacts C3, wire 109, contacts C4, wire 110 to wire 123 and so on, closing contactor F; and current also flows from wire 107 through contacts D2, contacts F2, winding of the switch M, contacts D3, contacts 70—71, to wire 108, and so on, closing the switch M; and current also flows from wire 107, through the brake winding 35 to wire 108 and so on, releasing the brake. Because of the delay of contactor D, the contactors F and M close in the sequence mentioned after the release of the brake.

When the forward "inch" push-button 78 is released the control circuit just described is broken and the press stops, and the press, of course, will run by its inching movement as long as the push-button 78 is maintained depressed.

If, however, it be desired to inch the press in the reverse direction, the push-button 83 is depressed, opening contacts 84—85 and closing contacts 86—87. Current from wire 120 as before now flows through closed contacts 73, through closed contacts 86, by wires 126 and 127, through the windings 128 and 129 of the contactors G and H, by wire 130 through closed contacts C5, by wire 131 through closed contacts 87, through closed contacts 80 to wire 125, and so on. Contactor G closes and subsequently thereto contactor H closes, being delayed by a time-interval device such as the dash-pot 132 diagrammatically illustrated.

When contactor G closes, it closes contacts G2 and G3 and opens contacts G1 and then current flows as before to wire 126, thence through closed contacts G2 to wire 107, through the brake winding 35 to wire 108, thence through contacts G3 to wire 131, releasing the brake. When contactor H closes it closes contacts H1 to H4 and the current flowing from the wire 126 through contacts G2 to the wire 107, flows througs contacts H2, contacts F1, winding 133 of the contactor R, contacts H3 to the wire 108, and through contacts G2 to the wire 107, flows through cnotacts R, closing its contacts R1 and opening its contacts R2. Current then flows as before to the wire 107 and thence through contacts H1, contacts R2, winding 112 of the contactor M, contacts H4, by wire 134, through contacts 70—71 to the wire 108, contacts G3 to wire 131, and so on, closing contactor M.

This, by reference to Fig. 6, gives current to the motor 10 in the reverse direction, current from the main 114 of that figure flowing through the contacts M2 of the contactor M to the wire 117, being in the same direction as before; but the current in the other two phases of the motor being reversed, current from the main 115 flowing through contacts M3, by a wire 135, through contacts R3, to the main 119, and current from the main 116 flowing by wire 136 through contacts R4 and by wire 137 to the main 118.

The motor thus inches in the reverse direction so long as the push-button 83 is held depressed, and the control circuits are broken when it is released and the brake is set to stop the press.

There are a number of interlocks throughout the system by which abnormal operation is prevented, besides the safety features above described. The contactors C and D cannot operate unless the contactor G is open, this being effected by placing the contacts G1 in series with the windings of the contactors C and D. The contactors G and H cannot operate unless the contactor C is open, this being effected by placing the contacts C5 in series with the windings of the contactors G and H. The usual interlock between the forward and reverse contactors F and R is effected by the contacts R1 and F1.

Furthermore, when the inch push-button 78 or 83 are operated, control current to the brake winding and to the contactors F and M, or R and M as the case may be, is initiated by magnetic contactors, but the control current to the brake winding is interrupted directly on the push-button contacts to set the brake, even if a magnetic contactor should stick closed, this corresponding to a like protection described above at the contacts 77 of the push-buttons 7, and in this connection, it may be added that the brake may be made powerful enough to stop the press even if the motor continues to be energized.

As referred to above, by providing the dashpot or other time interval devices 104 and 132, closure of the main motor current contactors F and M, or R and M as the case may be, to effect starting, is delayed until after the brake is released. Provision may also be made, if desired, as will now be described, to insure that the motor current will be interrupted to effect stopping, before the brake is set, particularly when the machine is operating by single cycles, that is to say, with the controller of Fig. 4 in the "run" position.

When the operators depress their push-buttons 7—7 to cause the contactors B, C and D to close, and the brake winding 35 and the windings 111 and 112 of the contactors F and M to be energized across the wires 107 and 108, the current through the windings of the contactors F and M flows through closed contacts B3. It will be assumed that the operators will hold their push-buttons closed to the end of the cycle. The limit switch 58 is provided and is set to open at about 213 degrees and to close at about 340 degrees; which opening point is after the limit switches 59 and 60 close to take over the control from the push-buttons. Opening of the limit switch 58 de-energizes contactor B and causes the said contacts B3 to open, and thereafter the current to the winding of the contactors F and M flows through a limit switch 61, provided in parallel with the contacts B3, this limit switch being set to close at about 45 degrees from the start of the cycle and opening say at 350 degrees. When the cycle has proceeded to approximately 350 degrees, the limit switch 61 opens and breaks the current to the contactors F and M (B3 being open) causing them to open to break the motor current, and the momentum of the press will cause it to drift the remaining 10 degrees of the cycle, and open the limit switches 59 and 60 to de-energize the brake winding 35 and set the brake. Thus, the motor is de-energized before the brake is set. In the meantime, and at about 340 degrees, the limit switch 58 controlling the contactor B has again closed, so that when the push-buttons 7 are released to again operate the contactor A, and then again depressed, another cycle can be repeated.

In some cases the operators become expert and will release their push-buttons 7 to again operate the contactor A and then depress the push-buttons for the next cycle, before the press has reached the end of the preceding cycle. In this connection, the limit switch 58 is set to close before the limit switch 61 opens; and contactor B, and therefore contacts B3 as well as contactors C and D, and their associated contacts will close before limit switch 61 opens; so that when the press reaches the end of the cycle, at say 360 degrees, the limit switches 59 and 60 will be ineffective as will also the limit switch 61, and the press may therefore immediately, and without stopping, proceed on the next cycle.

It is assumed that when the limit switch 61 opens at 350 degrees to effect cutting off of the motor current, that the press will by momentum drift to the end of the cycle at which the limit switches 59 and 60 open to set the brake, but if, due to any cause, the press should not drift to the end of the cycle, the limit switch 58 will in any event be already closed at 340 degrees so that if the push-buttons are held closed or are again closed, B3 will be closed, bridging the limit switch 61, and the press will continue to the end of the cycle. The provision for adjustment of the limit switches above described makes possible a setting of the limit switch 61 at which, when it cuts off the motor current, the press will drift to the end of the cycle at which the brake is set subsequently to the opening of the motor circuit.

In the arrangement described above in connection with Fig. 3, current to energize the brake winding 35 and the windings of the motor switches F and M all flows over a line comprising in series the contacts 77 of the push-buttons, wire 97, wire 101, wire 105, wire 106, and wire 107; and after flowing through the said windings goes back to the source over a like wire circuit; and in some cases the necessary current is so great at the relatively low voltage, such as 110 volts, which it is desired to use on the mains 89 and 90, that excessively large wires must be employed in an installation, and in some cases it may be desirable to sacrifice some of the advantages described above for this system for this reason.

Such a modified system is shown in Fig. 5. In this system, the circuits for the push-buttons, contactors A, B, C and D, limit switches 59 and 60, controller contacts 62 and 63, 64 and 65, 66 and 67, 68 and 69, 72 and 73, 74 and 75, and the operation thereof, down to and including the closure of contacts C and D, is the same as that described in connection with Fig. 3. The system below the contactors C and D is, in general, different, and will be described in connection with a description of its mode of operation.

When the master controller of Fig. 4 is set for the "run" position and the operators have pressed their push-buttons 7—7, contactors B, C and D close as before. Upon the operation of contactor C, and closure of its contacts C1 to C4, current flows directly from the main 89 by a wire 138 to a wire 139, thence through closed contacts C2, through the winding 35 of the brake, through closed contacts C3, by a wire 140, and a wire 141, to the other supply main 90, releasing the brake.

Upon the subsequent operation of contactor D current, which as above described flows through the contact C2, flows by a wire 142, to a wire 143, and thence through closed contacts D1, and contacts R1, through the winding 111 of the contactor F, and through contacts D4, and closed contacts B3, to a wire 144, and thence through contacts C3, to wires 140, 141, and so on, operating the motor contactor F; and after the contactor F has operated current flows from the wire 143, through closed contacts D2, closed contacts F2, through the winding 112 of the contactor M, through contacts D3, and wire 145, through contacts B3, to the wire 144, etc., operating the motor switch M, and the motor starts in the forward direction.

When the contactor C is opened, either by release of the push-button 7 in the early part of the cycle or by operation of the limit switches 59 and 60 later in the cycle, the contacts C2 and C3 open, causing the motor current to be cut off at the contactors F and M, and setting the brake, the limit switch 61 operating as before to effect the sequence thereof.

When it is desired that the machine shall run continuously, cycle after cycle, the controller contacts 66 and 67, 68 and 69, and 70 and 71 will be closed. The cycle is initiated by closing the push-button 7 as described above, to effect release of the brake and operation of the motor contactors F and M. As soon as contactor M closes its contact M1, contactors C and D will remain energized, as in the form of Fig. 3, and their contacts conduct current from the wire 138 to the wire 141 to maintain contactors F and M operated and the brake released, as described above for continuous operation of the machine, until the circuit to the contactors C and D is interrupted by the stop button 88.

If it be desired to inch in the forward direction, the controller contacts 72—73, 74—74 and 70—71 will be closed and upon depressing the forward inch button 73, current will flow from the wire 120, as described in connection with Fig. 3, to the wire 102, operating contactors C and D, and when the contacts C2 and C3 close, the brake and the contactors F and M will be operated as before, the limit switch 61 being bridged by the controller contacts 70—71, and the motor will run as long as the forward push-button 28 is maintained depressed, subject as before, to being stopped by the stop-button 88.

When it is desired to inch in the reverse direction, the reverse inch push button 83 is depressed, current then flows from the wire 120 as before to a wire 126 and thence by wire 127 through the windings of the contactors G and H, to the wire 130, through contacts C5, to wire 131 as before, operating the contactors G and H in sequence. Upon operation of contactor G, which has one set of normally closed contacts G1, and four sets of normally open contacts G2 to G5, current flows from the line 89 to wire 138 and thence through closed contacts G2, to wire 143, thence through the brake winding 35, to wire 144, and through contacts G4, to the wire 141, and thence to the line 90, releasing the brake. Subsequently, upon operation of contactor H, current flows from the wire 138, through closed contacts G3, contacts H2, contacts F1, through the winding of the contactor R, closed contacts H3 and G5, to the wire 141, etc., operating contactor R; and then current flows from the wire 138, through the contacts G2, H1, and R2, through the winding of the contactor M, through contacts H4 to wire 146, through controller contacts 70—71 to wire 147, and through contacts G4 to the wire 148, and so on; and the brake being released and the contactors M and R being closed, the motor starts and will be stopped when the push-button 83 is released to de-energize the contactors G and H.

It will be apparent from Fig. 5, that the machine and its motor may be caused to operate a single cycle and stop, or repeat the cycles continuously, or be inched in either direction, as in the form of Fig. 3, but that the brake winding 35, and the windings of the contactors F, M and R, are energized directly across the supply mains, the energization being both initiated and interrupted on the contacts of magnetic contactors which may be desirable in some cases, as explained above.

The push-button switches 7—7 and 89 and 78—83 are referred to as normally taking up the positions illustrated and as is well known this may be effected by springs or other means not shown, yieldable to permit the push button to be moved to its operated position and to restore it to its normal position when released.

My invention is not limited to the exact details of construction illustrated and described, changes and modifications may be made within the spirit of my invention without sacrificing its advantages and within the scope of the appended claims.

I claim:

1. In a control system for a cyclically operating machine, an electric motor drivingly connected to the machine, a source of electric current, a normally set brake for stopping and holding the machine, an operator's switch, means including electrically operable means and circuit means associated therewith responsive to operation of the operator's switch to effect release of the brake and energization of the motor to start the machine and motor, and switch means operable by movement of the machine at the end of a cycle to effect de-energization of the motor and setting of the brake to stop the machine, and means to cause de-energization of the motor to occur before setting of the brake to stop the machine.

2. In a control system for a cyclically operating machine, a source of electric current, an electric motor drivingly connected to the machine, a brake for the machine, an operator's switch, a magnetic device and means associated therewith to effect release of the brake when energized and setting of the brake when de-energized, magnetic means and circuit means associated therewith effective when energized to effect energization of the device and release of the brake and energization of the motor by current from the source to start the machine and motor, a circuit controlled by the operator's switch for energizing the magnetic means when the contacts of the operator's switch are closed, and for de-energizing the magnetic means and for also de-energizing the magnetic device directly at the contacts of the operator's switch when it is opened.

3. In a control system for a cyclically operating machine, a source of electric current, an electric motor drivingly connected to the machine, a normally set brake for stopping and holding the machine, an operator's switch, an electro-magnetic device and means associated therewith to effect release of the brake when the device is energized, electro-magnetic means and switch means operated thereby to effect energization of the motor by source current to start it and the machine, the energization of the electro-magnetic means being responsive to closure of the operator's switch, the energization of the device being responsive to operation of the switch means by the electro-magnetic means, and de-energization of the device being responsive directly to opening of the operator's switch.

4. In a control system for a cyclically operating machine, a source of electric current, an electric motor drivingly connected to the machine, a normally set brake for stopping and holding the machine, an operator's switch, an electro-magnetic device and means associated therewith to effect release of the brake when the device is energized and setting of the brake when it is de-energized, electro-magnetic means and circuit means associated therewith to effect energization of the motor by source current to start it and the machine when the electro-magnetic means is energized and effect de-energization of the motor when it is de-energized, the energization of the electro-magnetic means and the device being responsive successively to closure of the operator's switch, de-energization of the device being responsive to operation of the operator's switch.

5. In a control system for a cyclically operating machine, an electric motor drivingly connected to the machine, a normally set brake for stopping and holding the machine, an operator's switch, an electro-magnetic device and means associated therewith to effect release of the brake when the device is energized and setting of the brake when it is de-energized, electro-magnetic means and circuit means associated therewith to effect energization of the motor to start it and the machine when the electro-magnetic means is energized and to effect de-energization of the motor when de-energized, the energization and de-energization of the device and the electro-magnetic means being respectively responsive to operation and restoring of the operator's switch, means including delayed operating means to cause release of the brake to occur before energization of the motor, and a switch operated by movement of the machine at a predetermined point in its cycle to cause de-energization of the motor to occur before release of the brake.

6. In a control system for a cyclically operating machine, an electric motor drivingly connected to the machine, a normally set brake for stopping and holding the machine, a normally open operator's switch, an electro-magnetic device and means associated therewith to effect release of the brake when the device is energized and setting of the brake when it is de-energized, electro-magnetic means and circuit means associated therewith to effect energization of the motor to start it and the machine when the electro-magnetic means is energized and to effect de-energization of the motor when de-energized, means including circuit means to cause the energization and de-energization of the device and the electro-magnetic means to be respectively responsive to operation and restoring of the operator's switch, means including circuit means to cause the energizing current to the device to flow through the operator's switch after closing thereof and to cause the current to the device to be broken directly on the operator's switch when opened.

7. In a control system for a cyclically operating machine, an electric motor drivingly connected to the machine, a normally set brake for stopping and holding the machine, a normally open operator's switch, an electro-magnetic device and means associated therewith to effect release of the brake when the device is energized and setting of the brake when it is de-energized, electro-magnetic means and circuit means associated therewith to effect energization of the motor to start it and the machine when the electro-magnetic means is energized and to effect de-energization of the motor when de-energized, means including circuit means and delayed operation means to cause energization of the device to occur before energization of the motor, and means including a switch operated by movement of the machine at a predetermined point in its cycle to cause de-energization of the device to occur after de-energization of the motor.

OSWALD M. BUNDY.